US008272674B2

(12) United States Patent
Vance

(10) Patent No.: US 8,272,674 B2
(45) Date of Patent: Sep. 25, 2012

(54) SEAT PARTITION AND METHOD FOR PARTITIONING PASSENGERS IN A VEHICLE

(75) Inventor: George Vance, Rock Hill, SC (US)

(73) Assignee: Techcognic LLC, Rock Hill, SC (US)

( * ) Notice: Subject to any disclaimer, the term of this patent is extended or adjusted under 35 U.S.C. 154(b) by 20 days.

(21) Appl. No.: 12/887,686

(22) Filed: Sep. 22, 2010

(65) Prior Publication Data

US 2012/0068490 A1    Mar. 22, 2012

(51) Int. Cl.
*B60N 3/00* (2006.01)
(52) U.S. Cl. .................................... 296/24.46
(58) Field of Classification Search ............... 296/24.3, 296/24.31, 24.4, 24.43
See application file for complete search history.

(56) References Cited

U.S. PATENT DOCUMENTS

| | | |
|---|---|---|
| 2,640,595 A | 6/1953 | Byford |
| 2,649,593 A | 8/1953 | Kirsten |
| 2,706,819 A | 4/1955 | McClure |
| 3,044,800 A | 7/1962 | Wicker |
| 3,169,781 A | 2/1965 | Abruzzino |
| 3,510,164 A | 5/1970 | Setina |
| 3,652,120 A | 3/1972 | Bernbach |
| 3,694,023 A | 9/1972 | Burgess |
| 3,931,994 A | 1/1976 | Palmiter |
| 4,213,636 A | 7/1980 | King |
| 4,595,227 A | 6/1986 | Setina |
| 4,621,856 A | 11/1986 | McKenzie |
| 4,708,384 A | 11/1987 | LaRosa |
| 4,803,951 A | 2/1989 | Davis |
| 4,924,814 A | 5/1990 | Beaudet |
| 4,938,401 A | 7/1990 | Weisbrodt et al. |
| 4,943,105 A | 7/1990 | Kacar et al. |
| 4,960,293 A | 10/1990 | Bottinick et al. |
| 5,024,262 A * | 6/1991 | Huang .................. 160/370.21 |
| 5,054,837 A | 10/1991 | Chapman |
| 5,058,941 A | 10/1991 | Solomon et al. |
| 5,123,707 A | 6/1992 | Wurzell |
| 5,207,260 A | 5/1993 | Commesso |
| 5,255,958 A | 10/1993 | Frischmann |
| 5,474,329 A | 12/1995 | Wade et al. |
| 5,529,341 A | 6/1996 | Hartigan |
| 5,536,057 A | 7/1996 | Stewart |
| 5,720,458 A | 2/1998 | Carpenter |
| 5,848,817 A | 12/1998 | Niehaus |
| 5,971,487 A | 10/1999 | Passehl |
| 6,086,128 A | 7/2000 | Whitehead, Sr. |
| 6,089,659 A | 7/2000 | Toyota |

(Continued)

FOREIGN PATENT DOCUMENTS

WO    2012040011 A2    3/2012

*Primary Examiner* — H Gutman
(74) *Attorney, Agent, or Firm* — Tillman Wright, PLLC; James D. Wright; Chad D. Tillman

(57) ABSTRACT

A partition for use in vehicles having interior cabin space including at least one row of seats includes a deformable frame and at least one attachment device. The deformable frame is covered at least partially with a fabric material. The at least one attachment device attaches the deformable frame to a portion of a vehicle. Upon installation in a vehicle, the deformable frame separates a first passenger seat of the vehicle from a second passenger seat in the same row.

20 Claims, 9 Drawing Sheets

U.S. PATENT DOCUMENTS

| | | | |
|---|---|---|---|
| 6,142,574 | A | 11/2000 | Alexander |
| 6,155,621 | A | 12/2000 | Nishida et al. |
| 6,250,700 | B1 | 6/2001 | Traxler |
| 6,260,903 | B1 | 7/2001 | von der Heyde |
| RE37,924 | E * | 12/2002 | Kellogg et al. ......... 220/9.2 |
| 6,494,335 | B1 * | 12/2002 | Kellogg et al. ......... 220/9.3 |
| 6,502,859 | B1 | 1/2003 | Svetlik |
| 6,669,259 | B2 | 12/2003 | Murray et al. |
| 6,688,506 | B2 | 2/2004 | Schwartz |
| 6,742,837 | B1 | 6/2004 | Alexander |
| RE38,591 | E * | 9/2004 | Kellogg et al. ......... 34/442 |
| 6,827,382 | B2 | 12/2004 | Murray et al. |
| 6,871,894 | B2 | 3/2005 | Zummack |
| 6,948,632 | B2 * | 9/2005 | Kellogg et al. ......... 220/9.4 |
| 6,983,969 | B2 | 1/2006 | Murray et al. |
| 7,066,516 | B2 | 6/2006 | Mulvihill et al. |
| 7,140,656 | B2 | 11/2006 | Allgayer et al. |
| 7,195,297 | B2 | 3/2007 | Murray et al. |
| 7,281,742 | B2 | 10/2007 | Porter, II et al. |
| 7,438,112 | B2 | 10/2008 | Cheng |
| 7,562,931 | B2 | 7/2009 | Stojanovic |
| 7,665,790 | B2 | 2/2010 | Oino |
| 7,669,907 | B2 | 3/2010 | Spater et al. |
| 7,717,484 | B2 | 5/2010 | Parle et al. |
| 7,731,255 | B2 | 6/2010 | McJunkin |
| 7,789,445 | B2 * | 9/2010 | Hoffman et al. ......... 296/24.31 |
| 2002/0180229 | A1 | 12/2002 | Wheat |
| 2004/0232719 | A1 | 11/2004 | Scarlett |

* cited by examiner

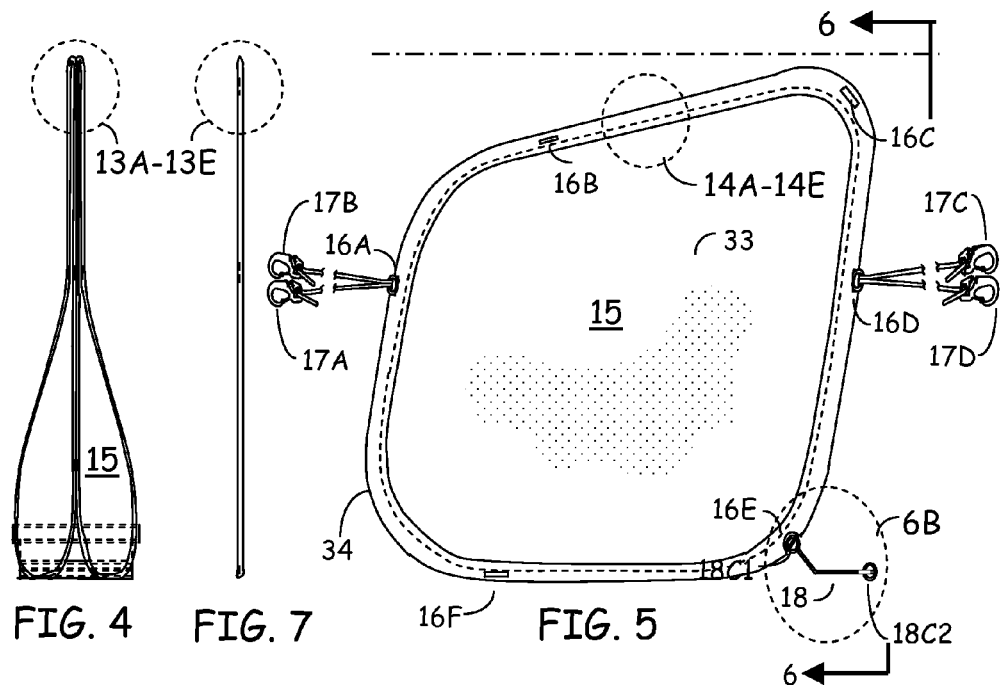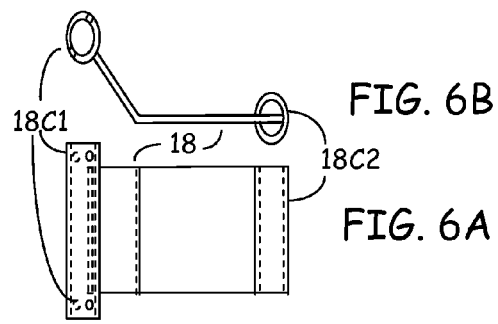

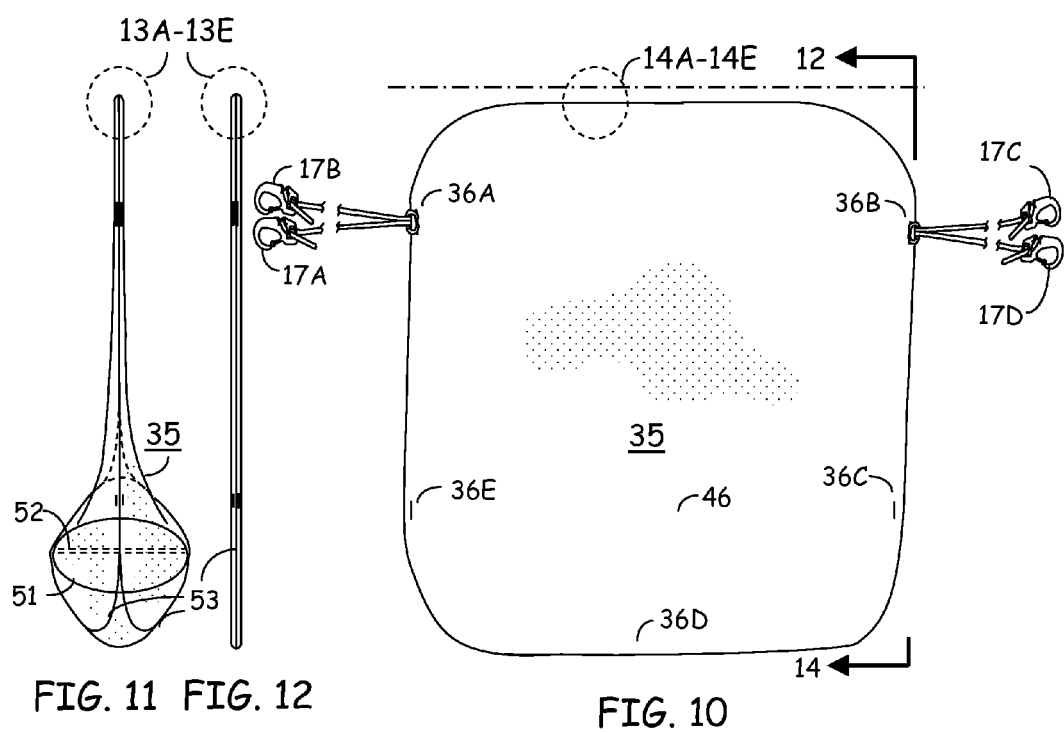

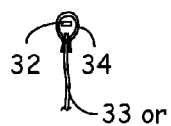 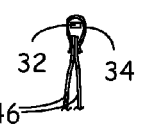 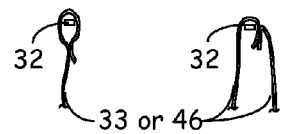  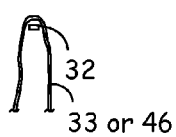
FIG. 13A   FIG. 13B   FIG. 13C   FIG. 13D   FIG. 13E
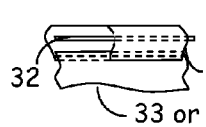 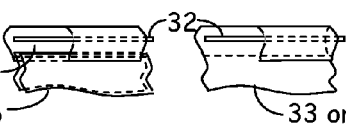 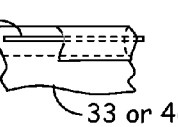 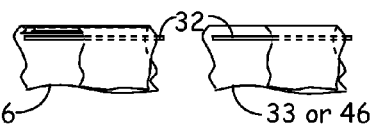
FIG. 14A   FIG. 14B   FIG. 14C   FIG. 14D   FIG. 14E
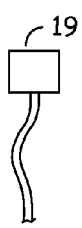 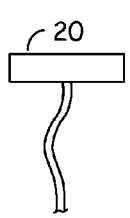  
FIG. 15A   FIG. 15B   FIG. 15C   FIG. 15D

SEAT PARTITION AND METHOD FOR PARTITIONING PASSENGERS IN A VEHICLE

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to an apparatus for partitioning between individuals in a vehicle, and in particular, to a removable barrier or divider to be placed between individuals, most commonly children, sitting adjacent in a vehicle.

2. Background

Traveling with children can prove difficult and even unsafe. Often they can be argumentative and quarrelsome while in a vehicle. This can result in a significant distraction and annoyance to the driver and others also in the vehicle. The removal of focus from driving can result in an unsafe condition.

The use of a partition or divider reduces the interaction to temporarily control behavior. This allows for an improved atmosphere in the vehicle, especially so that the driver can better focus on driving.

Prior devices have been developed to separate children by placing a divider or partition between them. For example, U.S. Pat. No. 5,123,707 to Wurzell is a device that includes a rigid frame and a rigid panel to provide separation between children. After being frictionally engaged for attachment, children are seated on each side on a bench seat.

Another conventional device with a similar purpose is described in U.S. Pat. No. 7,669,907 B2 to Spater; which uses material that is attached at numerous points to isolate the rear seats from the front and can also divide the rear bench seat. The shape of the partition is largely determined by the area between the attachment points.

Accordingly, a need exists for a partition or divider that helps to reduce or obstruct visibility between children seated adjacent one another. A need also exists for a partition or divider that acts as a physical barrier between children seated adjacent one another. A need also exists for a partition or divider that can be reduced in size for easy and compact storage. A need also exists for a partition or divider with accident-friendly construction. Further, a need exists for a partition or divider that allows a view of the children from the front. Still further, a need exists for a partition or divider that is easy to install and remove.

SUMMARY OF THE PRESENT INVENTION

The present invention includes many aspects and features. Moreover, while many aspects and features relate to, and are described in, the context of partitions for passenger vehicles, the present invention is not limited to use only in connection with partitioning passengers within a vehicle, as will become apparent from the following summaries and detailed descriptions of aspects, features, and one or more embodiments of the present invention.

Broadly defined, the present invention according to a first aspect includes a partition for use in vehicles having interior cabin space including at least one row of seats. The partition includes a deformable frame defining a perimeter and at least one attachment device for attaching the deformable frame to a portion of a vehicle. The deformable frame is at least partially covered with a fabric material. Upon installation in a vehicle, the deformable frame separates a first passenger seat of the vehicle from a second passenger seat in the same row.

In features of this aspect, the at least one attachment device may be configured to be attachable to a headrest of the vehicle; the deformable frame may be formed of a deformable wire; the fabric material may fully cover the deformable frame, thereby defining a hollow interior; the deformable frame may be configured to be collapsible upon itself, thereby reducing the size thereof for storage; and ends of the deformable frame may be connected together to form a loop with a crimped connector.

In further features of this aspect, the at least one attachment device may be attached to the deformable frame at an attachment location adjacent the perimeter thereof; the at least one attachment device may include a bracket having a tongue portion extendable into a crevasse between a seat bottom and a seat back of the vehicle; the at least one attachment device may include a snap hook; the at least one attachment device may be configured to permit tool-less installation of the deformable frame within the vehicle; the deformable frame may define a first panel at least partially covered by the fabric material; and the partition may further include a second deformable frame, wherein the second deformable frame defines a second panel at least partially covered by a fabric material, the second panel being generally aligned back-to-back with and attached to the first panel.

Broadly defined, the present invention according to a second aspect includes a partition for use in vehicles having interior cabin space including at least one row of seats. The partition includes a semi-rigid, deformable frame formed of a wire-based material and at least one attachment device for tool-lessly attaching the deformable frame to a portion of a vehicle. The deformable frame defines a perimeter and being at least partially covered with a fabric material. Upon installation in a vehicle, the deformable frame separates a first passenger seat of the vehicle from a second passenger seat in the same row. Additionally, the deformable frame is configured to be collapsible upon itself, thereby reducing the size thereof for storage.

In features of this aspect, the at least one attachment device may be attached to the deformable frame at an attachment location adjacent the perimeter thereof; the at least one attachment device may include a bracket having a tongue portion extendable into a crevasse between a seat bottom and a seat back of the vehicle; and the at least one attachment device may include a snap hook.

Broadly defined, the present invention according to a third aspect includes a partition for use in vehicles having interior cabin space including at least one row of seats. The partition includes a deformable frame defining a perimeter, a base attached to the deformable frame and a fabric material at least partially covering the deformable frame at the perimeter thereof. Upon installation in a vehicle, the deformable frame is adapted to rest in an upright position on the floor of a vehicle to separate a first passenger seat of the vehicle from a second passenger seat in the same row.

In features of this aspect, the deformable frame may be configured to be collapsible upon itself, thereby reducing the size thereof for storage; the deformable frame may be formed of a deformable wire; and the fabric material may fully cover the deformable frame, thereby defining a hollow interior.

Broadly defined, the present invention according to a fourth aspect includes a partition, for use in vehicles having interior cabin space including at least one row of seats, as substantially shown and described.

Broadly defined, the present invention according to a fifth aspect includes a method of partitioning interior cabin space in a vehicle, including at least one row of seats, as substantially shown and described.

Broadly defined, the present invention according to a sixth aspect includes a method of partitioning interior cabin space in a vehicle including at least one row of seats. The method includes the steps of providing a partition having a deformable frame, at least partially covered with a fabric material, and at least one attachment device; arranging the deformable frame to have the shape of a panel; and tool-lessly attaching the deformable frame to a portion of the vehicle via the at least one attachment device. Upon installation in a vehicle, the deformable frame separates a first passenger seat of the vehicle from a second passenger seat in the same row.

In features of this aspect, the at least one attachment device may attach the deformable frame to a headrest of the vehicle; the deformable frame may be formed of a deformable wire; the fabric material may fully cover the deformable frame, thereby defining a hollow interior; the deformable frame may be configured to be collapsible upon itself, thereby reducing the size thereof for storage; and ends of the deformable frame may be connected together to form a loop with a crimped connector.

In further features of this aspect, the at least one attachment device may be attached to the deformable frame at an attachment location adjacent the perimeter thereof; the at least one attachment device may include a bracket having a tongue portion; the method may further include the step of positioning the tongue portion into a crevasse between a seat bottom and a seat back of the vehicle; and the at least one attachment device may include a snap hook.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 4 is a front view of the partition of FIG. 1;

FIG. 5 is a side view of the partition of FIG. 1;

FIGS. 6A and 6B depict a top view and a side view, respectively, of a bracket used with the partition of FIG. 1 so as to help secure the partition to the seat;

FIG. 7 is a front view of a second embodiment of a partition, similar to the partition shown in FIG. 1 but having a single panel;

FIG. 10 is a side view of the partition of FIG. 8;

FIG. 11 is a front view of the partition of FIG. 8;

FIG. 12 is a front view of a fourth embodiment of a partition, similar to the partition shown in FIG. 8, but having a single panel;

FIGS. 13A-13E depict end sectional views of various optional configurations of a portion of the partition depicted in each of FIGS. 4, 5, 7, 10, 11 and 12;

FIGS. 14A-14E depict side cutaway views of various optional configurations that correspond with the end sectional views of FIGS. 13A-13E;

FIGS. 15A-15D depict side views of various attachment devices that can be used to secure the partition to the vehicle;

DETAILED DESCRIPTION

Figure 1:
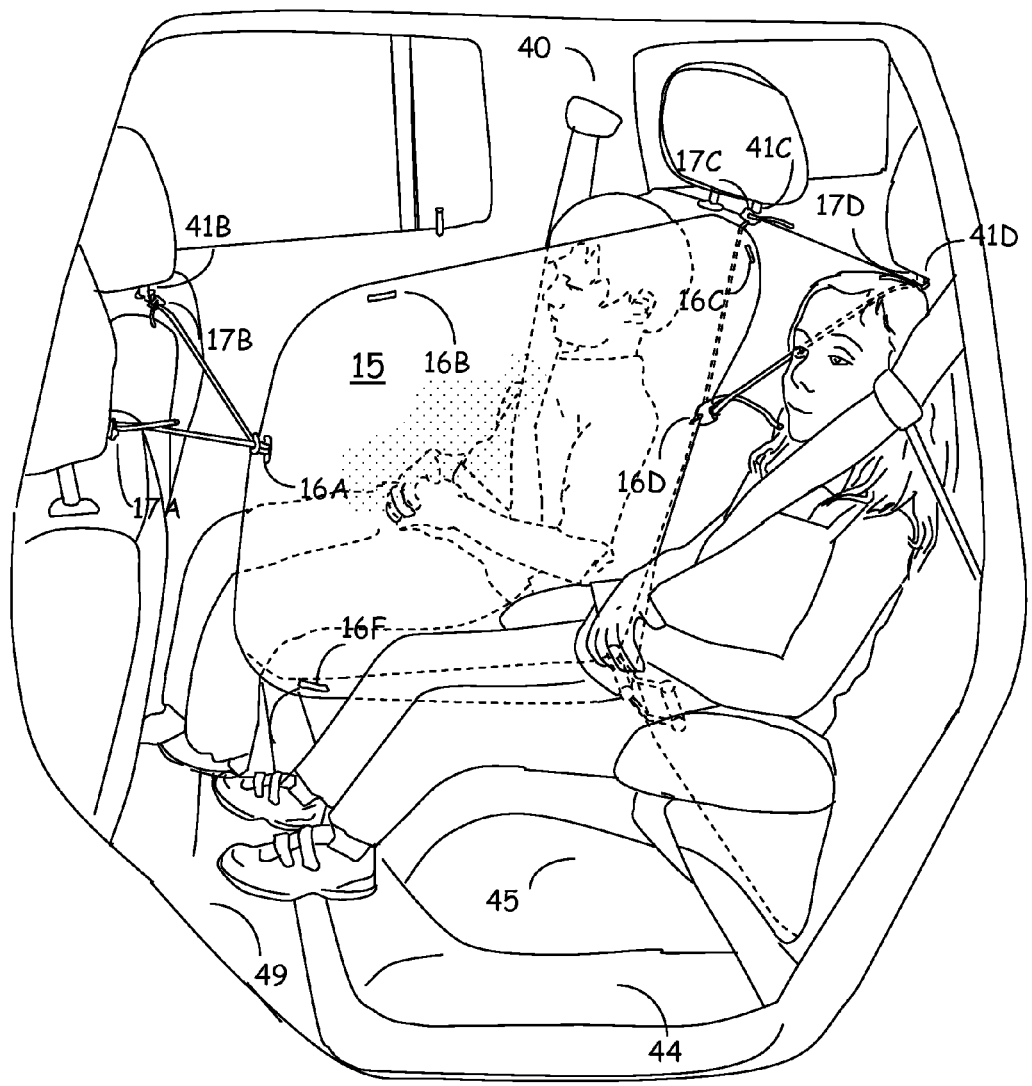
FIG. 1 is a perspective view of a first embodiment of a partition used in conjunction with the bench seat of a vehicle with occupants seated.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 is a perspective view of a first embodiment of a partition 15 used in conjunction with the bench seat of a vehicle 40 with occupants seated. As shown in FIG. 1, the partition 15 is configured for partitioning a bench seat in a vehicle 40. In particular, the partition 15 may be configured for use in connection with vehicles that include, but are not necessarily limited to cars, trucks, SUVs, minivans, station wagons. FIG. 4 is a front view of the partition 15 of FIG. 1, and FIG. 5 is a side view of the partition 15 of FIG. 1. As shown in FIG. 4, the partition 15 includes two aligned panels attached to one another.

Figure 2:
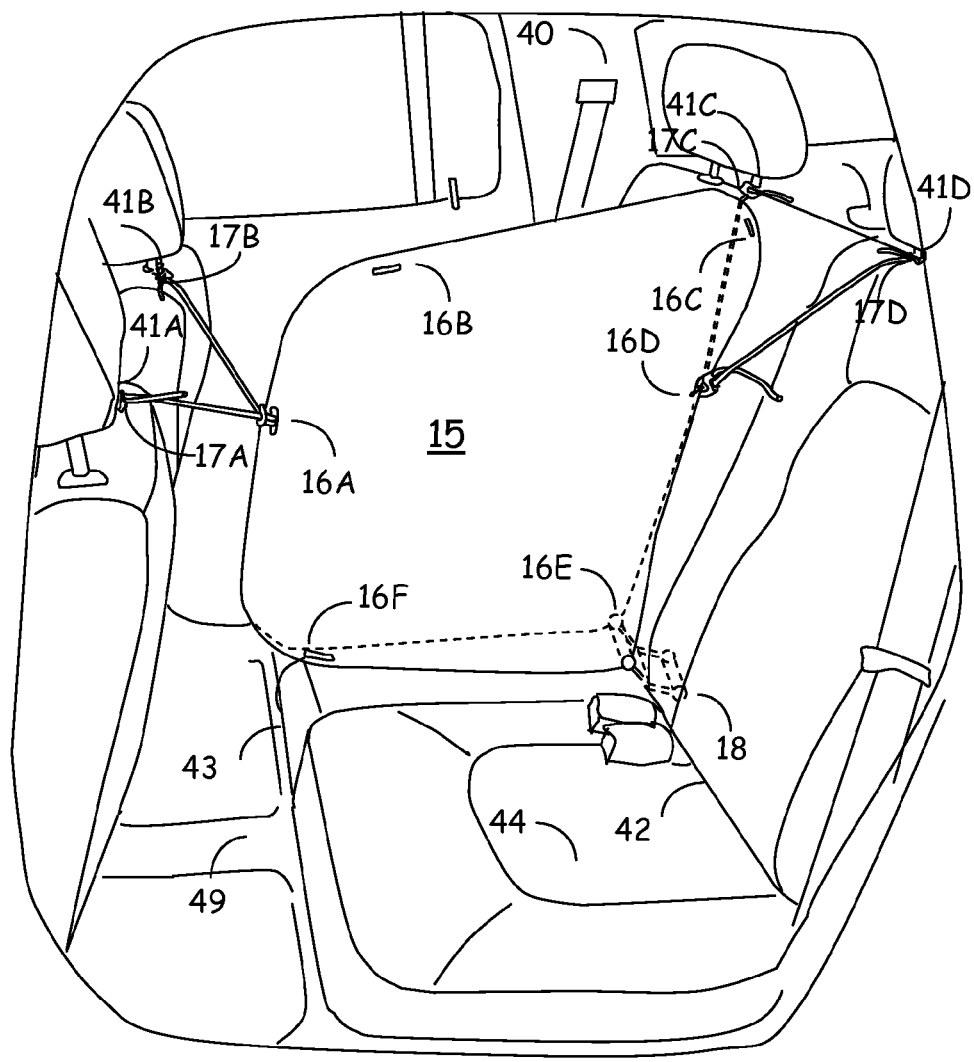
FIG. 2 is a perspective view of the partition of FIG. 1 in a vehicle in conjunction with a bench seat without occupants.
Figure 3:
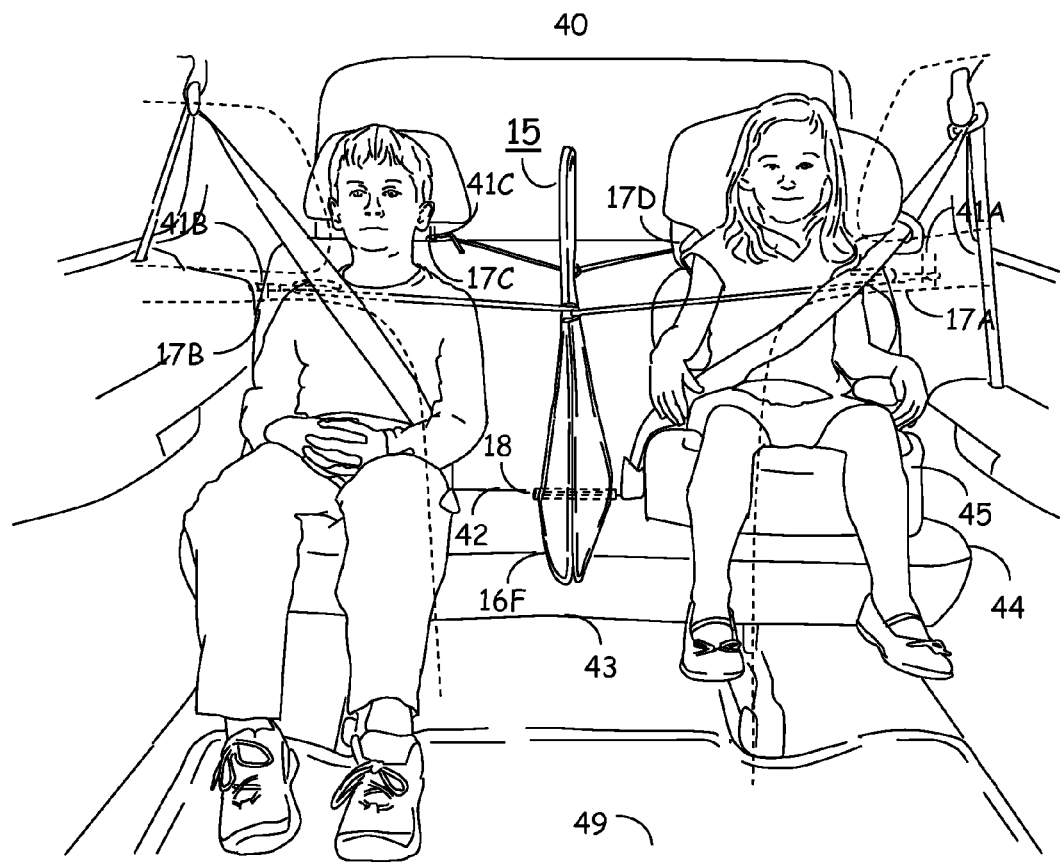
FIG. 3 is a front view of the partition of FIG. 1 in a vehicle with a bench seat with occupants seated.

FIG. 2 is a perspective view of the partition 15 of FIG. 1 in a vehicle 40 in conjunction with a bench seat without occupants, and FIG. 3 is a front view of the partition 15 of FIG. 1 in a vehicle 40 with a bench seat with occupants seated. As shown in FIGS. 1-3, the partition 15 may include one or more attachment points 16A, 16B, 16C, 16D, 16F to facilitate attachment of the partition 15 to the vehicle 40. Additionally, at another attachment point 16E, a bracket 18 may be wedged between the seat bottom 44 and the seat back of the vehicle 40 into the crevasse 42 between them. The bracket 18 can provide stability for the partition 15 when installed in the vehicle 40. As further shown in FIGS. 1-3, attachment points 16A, 16D may facilitate attachment of the partition to the vehicle by means of snap hooks and cords 17A, 17B, 17C, 17D to vehicle headrest pins 41A, 41B, 41C, 41D. Use of snap hooks and cords to attach the partition to the vehicle headrest pins may be in addition to the previously-mentioned bracket 18 wedged between the seat bottom and the seat back at attachment point 16E.

It should be appreciated by the Ordinary Artisan that any of the aforementioned attachment points 16A, 16B, 16C, 16D, 16E, 16F may be used in isolation or in combination with one another to facilitate attachment of the partition 15 to the vehicle 40. In this regard, the partition 15 is provided with versatility that permits use across a wide range of different vehicles. The embodiment depicted in FIGS. 1-3 illustrates the use of one contemplated combination of attachment points 16A, 16B, 16C, 16D, 16E, 16F. However, it should be noted that attachment point 16B might be chosen over attachment point 16A, or attachment point 16C might be chosen over the attachment point 16D. As another example, attachment point 16F could be utilized in conjunction with multiple types of attachment devices or mechanisms, such as those discussed below in connection with FIGS. 15A-15D and/or sewing, a button hole, a button, a tie, a ring (i.e., D-ring), a bracket, a bracket with a tongue, a pocket, strapping, an elastic mechanism, webbing, a zipper, a spring, a fastener, a clip, a cord, a cord lock, a string, fabric, a loop, a hook, a snap hook, an eyelet, a snap, hook and loop fasteners (i.e., Velcro®), a trap lock, a knot, ties, a weight, a wire frame base, tabs, ties, caps, plugs, or any combination thereof.

FIGS. 6A and 6B depict a top view and a side view, respectively, of a bracket 18 used with the partition 15 of FIG. 1 so as to help secure the partition 15 to the seat. The embodiment of the apparatus shows a frame 32 of the partition 15 passing through the bracket at 18C1. The attachment of the bracket 18 to partition 15 is not limited to the aforementioned attachment method and will be addressed in greater detail below.

FIG. 7 is a front view of a second embodiment of a partition, similar to the partition shown in FIG. 1 but having a single panel rather than a two-panel construction or other three-dimensional material covered wire frame constructions. Other aspects of the invention, including the aforementioned attachment points, may apply in a similar manner to the partition of FIG. 7. It should be appreciated by the Ordinary Artisan that the partition may have any of a range of different configurations, such as a solo panel construction, a two-panel construction, or other three-dimensional construction configurations that involve a material-covered wire frame.

Figure 8:
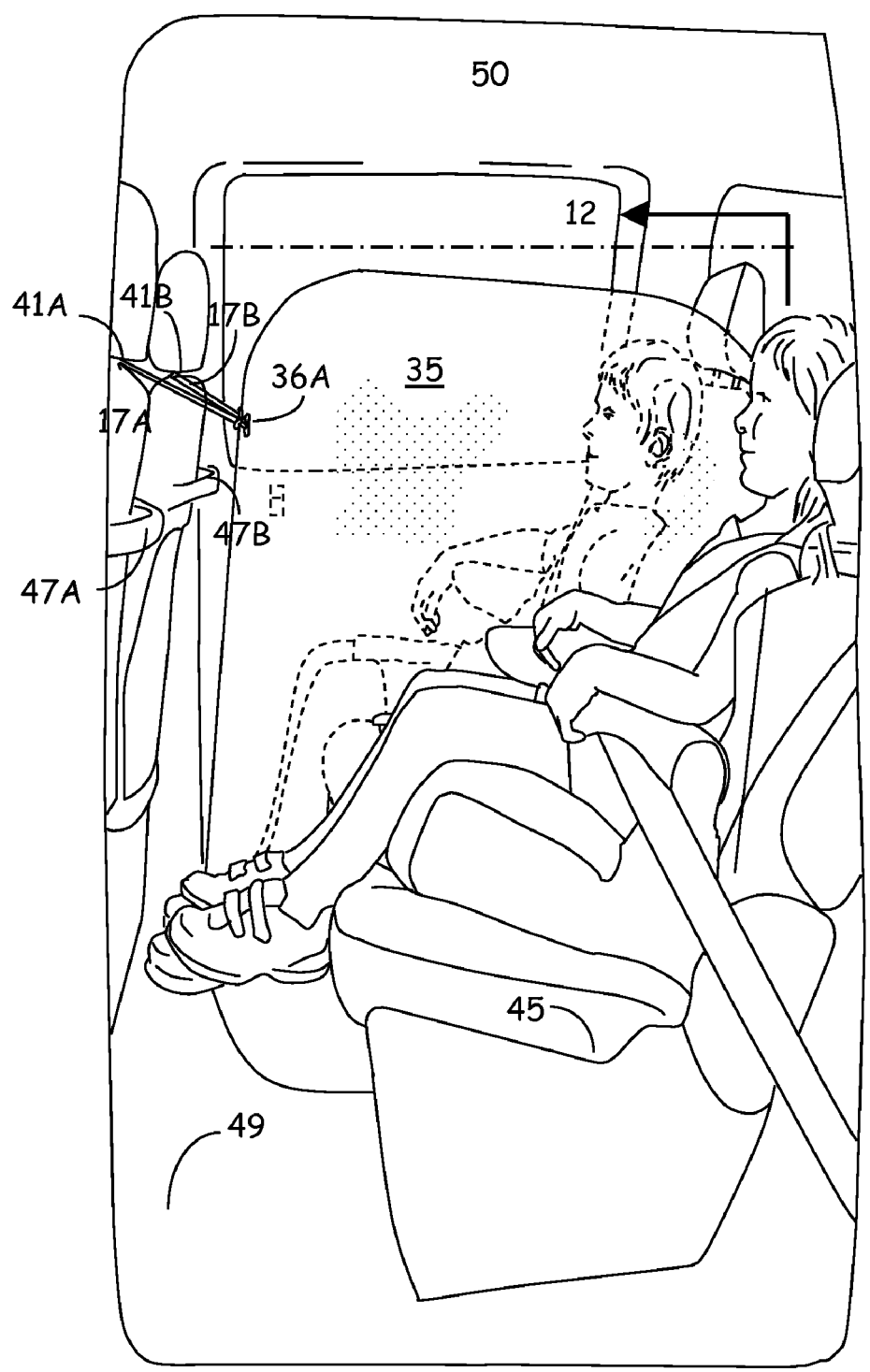
FIG. 8 is a perspective view of a third embodiment of a partition used in conjunction with a vehicle having two bucket seats or captain's chairs with occupants seated.
Figure 9:
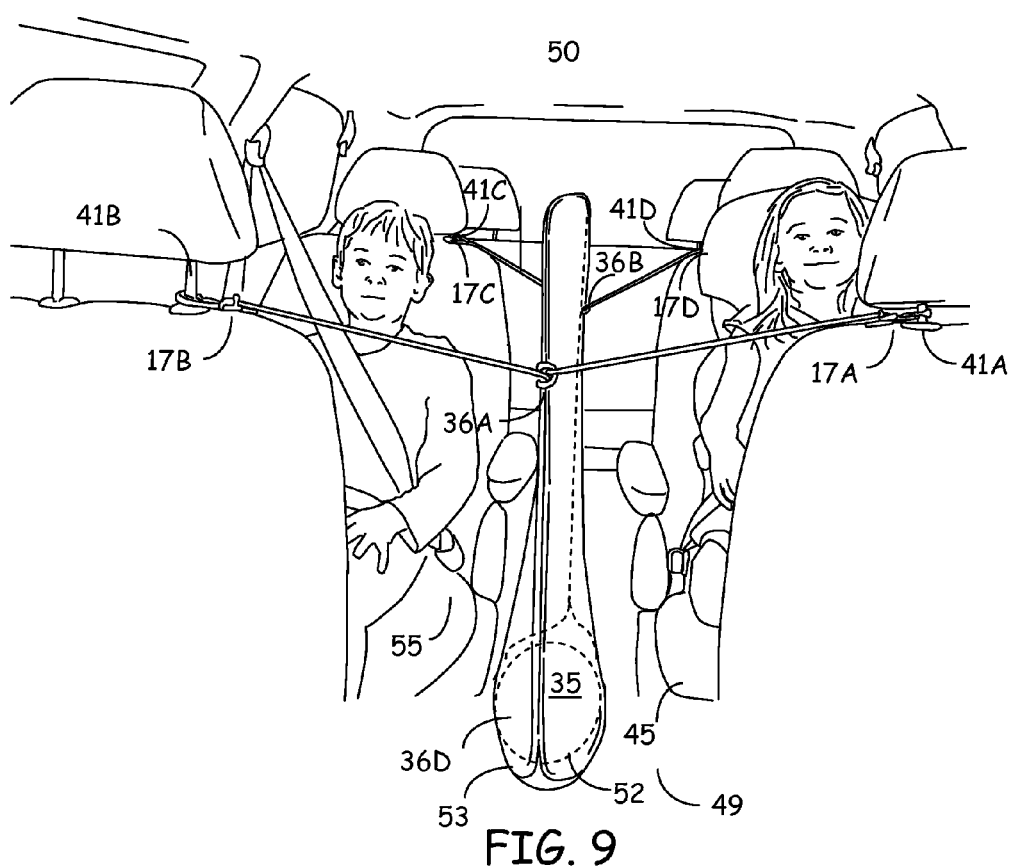
FIG. 9 is a front view of the partition of FIG. 8 in a vehicle with two bucket seats or captain's chairs.

FIG. 8 is a perspective view of a third embodiment of a partition 35 used in conjunction with a vehicle 50 having two bucket seats or captain's chairs with occupants seated, and FIG. 9 is a front view of the partition 35 of FIG. 8 in a vehicle 50 with two bucket seats or captain's chairs. As shown in FIGS. 8 and 9, the partition 35 may be configured for separating a bucket seat or captain's chair from an adjacent bucket seat or captain's chair, as well as the occupants of those seats, as commonly found, but not limited to, rear seating of a vehicle to include but not limited to SUVs, trucks, and minivans. As will be discussed herein, the partition 35 utilizes many of the same construction methods and concepts as partition 15, discussed above in connection with FIGS. 1-5.

FIG. 10 is a side view of the partition of FIG. 8, and FIG. 11 is a front view of the partition of FIG. 8. The base portion 52 of the partition 35, which is depicted in FIGS. 9 and 11, may be formed by a flexible perimeter 53 connected to a flexible base ring 51, rings, or possibly a plate (i.e., plastic or wood) to give stability. Such rings can be joined by tubing, such as metal, that the wire frame 32 is passed into or through to join both the ends and/or strands of wire, as discussed in greater detail below in connection with FIG. 18. A crimp 55 can aid in the retention of the wires. In this regard, the partition 35 may be configured to rest upright on the floor 49 of the vehicle 50 without use of attachment points. The base portion 52 of partition 35, with attachment points 36A and/or 36B, can provide additional stability, though the use of additional attachment points may further increase stability of the partition 35. As shown in FIGS. 8 and 9, the partition 35 may utilize attachment points 36A, 36B that are attached with snap hook and cords 17A, 17B, 17C, 17D to vehicle headrest pins 41A, 41B, 41C, 41D (in a manner similar to the embodiment set forth in FIGS. 1-5). As an example of the versatility of attachment options, snap hook and cords 17A, 17B may be attached to grab handles 47A, 47B instead of head rest pins 41A, 41B. The partition 35 can include additional or substitutive mounting members. For example, the additional mounting member can be a weight, such as a sand bag or bean bag, and/or a base, such as the incorporation of additional wire framing forming a base and may include attachment devices or mechanisms such as sewing, a button hole, a button, a tie, a ring (i.e., D-ring), a bracket, a bracket with a tongue, a pocket, strapping, an elastic mechanism, webbing, a zipper, a spring, a fastener, a clip, a cord, a cord lock, a string, fabric, a loop, a hook, a snap hook, an eyelet, a snap, hook and loop fasteners (i.e., Velcro®), a trap lock, a knot, ties, a weight, a wire frame base, tabs, ties, caps, plugs, or any combination thereof.

FIG. 12 is a front view of a fourth embodiment of a partition, similar to the partition shown in FIG. 8, but having a single panel rather than a two-panel construction or other three dimensional material covered wire frame constructions. Other aspects of the invention, including the aforementioned attachment points, may apply in a similar manner to the partition of FIG. 12. It should be appreciated by the Ordinary Artisan that the partition may have any of a range of different configurations, such as a solo panel construction, a two-panel construction, or other three-dimensional construction configurations that involve a material-covered wire frame.

In each of the embodiments described herein, the partition 15, 35 operates to separate or partition two occupants, more typically children, seated alongside one another in a vehicle 40, 50. In a preferred embodiment, the partition includes a flexible frame covered with a material. The combination of a flexible frame in conjunction with the shape of the material that it is attached to or located within gives the partition 15, 35 shape and structure. In this regard, the partition 15, 35 does not necessarily rely on attachment points for shape and, as a result, can partition beyond and/or above, the attachment points. As such, the partition 15, 35 is capable of promoting both a physical and/or a visual partitioning. The flexible construction of the frame also allows the partition 15, 35 to be stored in a smaller space than it may occupy while in use. The light flexible nature of the frame construction can reduce the potential for injury resulting from both vehicular and non-vehicular incidences. As the details of the drawings depict, the partition 15, 35 is versatile with multiple attachment points 16A, 16B, 16C, 16D, 16F, 36A, 36B, 36C, 36D, 36E, and attachment methods may include but are not necessarily limited to those that are set forth in FIGS. 15A-15D, discussed below.

FIGS. 13A-13E depict end sectional views of various optional configurations of a portion of the partition 15, 35 depicted in each of FIGS. 4, 5, 7, 10, 11 and 12, and FIGS. 14A-14E depict side cutaway views of various optional configurations that correspond with the end sectional views of FIGS. 13A-13E. In particular, FIGS. 13A-13E and 14A-14E depict various construction techniques that can be used to construct a flexible wire frame with fabric material 33, 46. These various construction methods may be applied to any of the embodiments discussed herein. In FIGS. 13A and 14A, the flexible wire frame 32 is shown contained in a fabric binding and sewn to the material 33, 46. This particular construction technique is also depicted in connection with partition 15 of FIGS. 4 and 5. In the example for partition 35, the construction technique used is depicted in FIGS. 13D and 14D. In at least some embodiments, the fabric binding may be formed of a separate piece 34 of material. Alternate construction techniques are shown in FIGS. 13B-13E and FIGS. 14B-14E. In FIGS. 13B and 14B, two layers of material 33, 46 are utilized with binding. In FIGS. 13C and 14C, the material 33, 46 is wrapped around the flexible wire 32 and sewn to serve as the binding fabric. In FIGS. 13D and 14D, the flexible wire 32 is not secured in a binding, but within the envelope of the cover of fabric. In FIGS. 13E and 14E, the construction is without a seam where the frame is located.

In further details of the partition 15, 35, the material 33, 46 may be composed of a fabric material such as nylon, and can include, but is not necessarily limited to, woven and non-woven fabric, synthetic fiber, natural fiber, synthetic sheet, or a combination thereof. The flexible frame may be made from a resilient flat wire. Alternatively round wire or another flexible resilient material may be used rather than a flat wire.

Figure 18:
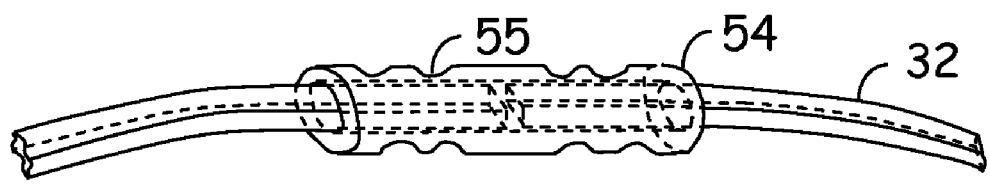
FIG. 18 is a cutaway view of a portion of a frame of the partition, depicting ends of the frame connected together.

FIG. 18 is a cutaway view of a portion of a frame of the partition, depicting ends of the frame connected together. The ends of the frame can be connected, joined, and/or the wires can be grouped using a connector 54 such as a piece of tubing, banding, or ties. The tubing connectors can be metal or plastic. Metal connectors can be as simple as a piece of metal tube that is crimped (such as that which is depicted in FIG. 18), or attached by other means, to ensure a mechanical bond to the frame (i.e., wire) inside the end of the tube. The plastic connector can be a tube or solid piece with either mechanical attachment (i.e., press fit or crimped) or thermally attached by melting the connector to the frame. In addition, the frame material may be bundled and be comprised of one or more wires.

A frame and the materials that cover it constitute a panel of the partition 15, 35. The apparatus may be comprised of one or more panels or other three dimensional material covered wire frame construction. The panels can be attached to each other and/or other elements of the partition 15, 35 by attachment devices or mechanisms such as sewing, a button hole, a button, a tie, a ring (i.e., D-ring), a bracket, a bracket with a tongue, a pocket, strapping, an elastic mechanism, webbing, a zipper, a spring, a fastener, a clip, a cord, a cord lock, a string, fabric, a loop, a hook, a snap hook, an eyelet, a snap, hook and loop fasteners (i.e., Velcro®), a trap lock, a knot, ties, a weight, a wire frame base, tabs, ties, caps, plugs or any combination thereof. As previously discussed in connection with FIGS. 7 and 12, the partition may have a single-panel construction. The embodiments depicted in FIGS. 7 and 12 may utilize the same construction and attachment methods as the partition 15 of FIGS. 4 and 5 and the partition 35 of FIGS. 10 and 11.

The attachment of the partition 15, 35 to the vehicle 40, 50 and/or itself can include multiple attachment locations and methods to allow it to be installed in a variety of vehicle sizes and types. In each of the embodiments described herein, attachment locations may be found on the perimeter of the partition 15, 35. Attachment of the partition utilizes at least one or more attachment points. Commonly two or three attachment points on the apparatus are utilized. For partition 15, a primary attachment point 16E may be utilized in connection with bracket 18, and for partition 35, attachment points 36A, 36B may be utilized alone or in combination.

Attachment points may be positioned in locations that facilitate attachment of the partition 15, 35 to vehicle features such as the headrest, headrest pole, arm rest, handle grab bar 47A, 47B on the back of the seats, front seats, vehicle child seat 45, between the seat and the car body 43, between the seat and the package tray, vehicle floor 49, seat belts, between the seat cushions, or other vehicle features. The attachment apparatus or mounting member may include, but are not necessarily limited to attachment devices and mechanisms such as sewing, a button hole, a button, a knot, a ring (i.e., D-ring), a bracket, a bracket with a tongue 18, a pocket, strapping, an elastic mechanism, webbing, a zipper, a spring, a fastener, a clip, a cord, a cord lock, a string, fabric, a loop, a hook, a snap hook 17A, 17B, 17C, 17D, an eyelet, a snap, hook and loop fasteners (i.e., Velcro®), a trap lock, a knot, tabs, ties, a weight, a cap, a plug, a wire frame base 52, 53, or any combination thereof. These attachment apparatus thereto can be used in conjunction and/or combination with same and/or other materials. For the embodiment of the partition 15 of FIGS. 1-5, a bracket 18 utilizing a tongue acts a securing member. The tongue can have an enlarged portion 18C2 to aid in retention to the vehicle.

Returning now to FIG. 5 and FIGS. 6A and 6B, a side view and a top view of the seat bracket 18 are shown. The embodiment of the apparatus shows the frame 32 of the partition 15 passing through the bracket at 18C1. The attachment of the bracket 18 to partition 15 is not limited to the aforementioned attachment method. Alternative bracket attachment methods include, but are not necessarily limited to attachment devices and mechanisms such as sewing, a button hole, a button, a tie, a ring (i.e., D-ring), a bracket, a bracket with a tongue, a pocket, strapping, an elastic mechanism, webbing, a zipper, a spring, a fastener, a clip, a cord, a cord lock, a string, fabric, a loop, a hook, a snap hook, an eyelet, a snap, hook and loop fasteners (i.e., Velcro®), a trap lock, a knot, ties, a weight, a wire frame base, tabs, ties, caps, plugs, or any combination thereof.

Figures 16, 17:
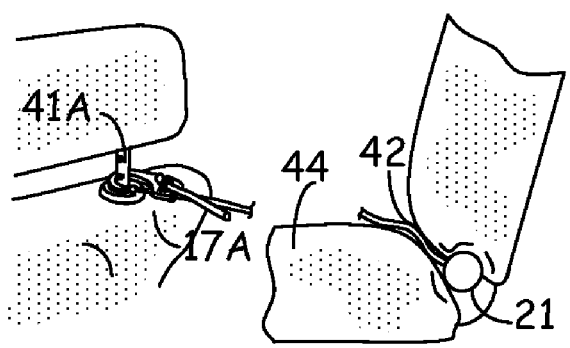
FIG. 16 depicts a snap hook attachment device attached to the pole of a headrest.
FIG. 17 depicts an attachment device wedged into the crevasse of a seat bottom and a seat back.

FIGS. 15A-15D depict side views of various attachment devices that can be used to secure the partition to the vehicle. FIG. 16 depicts a snap hook attachment device attached to the pole of a headrest. In particular, FIGS. 15A-15D depict some of the attachment devices that can be employed to attach the partition 15, 35 to the vehicle 40, 50. In FIG. 15A, the attachment device 19 utilizes a rectangular shape. In FIG. 15B, the attachment device 20 utilizes a cylindrical shape. In FIG. 15C, the attachment device 21 utilizes a spherical shape that can be wedged between two vehicle features such as the crevasse 42 of the seat. In FIG. 15D, the attachment device 17 utilizes a hook for retention. In each of FIGS. 15A-15D, cording may be utilized to attach the partition 15, 35. The cording may have an elastic property. The attachment device 17 of FIG. 15D is depicted in use in FIG. 16, as well as in FIGS. 1-3, 5, 8, 9 and 10.

FIG. 17 depicts an attachment device wedged into the crevasse 42 of a seat bottom and a seat back. In particular, FIG. 17 depicts a seat with a sphere attachment device 21 wedged in the seat 44 crevasse 42. Other attachment devices, such as those described in connection with FIGS. 15A-15D may similarly be utilized. For instance, the attachment device wedged into the crevasse 42 of a seat bottom and a seat back may have a rectangular or cubic shape (FIG. 15A), or a rod shape (FIG. 15B), and can be utilized on other vehicle features such as the crevasse between the seat bottom and the floor 49 of the vehicle in FIG. 2, as an example.

The attachment devices discussed herein allow for ease of installation and removal of the partition 15, 35 without the need for tools. The time required for installation or removal may be less than 60 seconds. As the frame of the partition 15, 35 is comprised of a wire that, in many cases is itself deformable or bendable, the partition 15, 35 is configured to be collapsible upon itself. In this regard, the partition 15, 35 is collapsible to a size that can be more than at least half the size of the partition 15, 35 when it its use configuration. Once collapsed, the removed partition 15, 35 can be stored compactly due to the flexible and resilient nature of the construction. This could allow storage of the partition, for instance, in a bag or container that is smaller than the space the partition occupies while in use. When the partition 15, 35 is installed in a vehicle 40, 50, the attachment devices do not significantly impair view of the partitioned occupants, as depicted in FIG. 3 and FIG. 9.

A method for installation of the partition 15 of FIGS. 1-7 includes securing the mounting bracket by sliding and or wedging it between the bottom cushion of the bench seat and the seat back cushion or arm rest, or other attachment apparatus described herein. Additional mounting of the partition 15 can include securing it to the vehicle 40 by using the aforementioned attachment device(s), or combination thereof, to attach to an aforementioned attachment point(s) to the frontal headrest pole(s), frontal seat grab bars, other frontal vehicle feature, or combination thereof. Additional mounting of the partition 15 can also include securing it to the vehicle by using the aforementioned attachment device(s), or combination thereof, to attach to an aforementioned attachment point to a rearward vehicle attachment feature, such as the arm rest, child seat attachment point, bench seat headrest poles, other vehicle feature, or combination thereof.

A method for installation of the partition 35 of FIGS. 8-12 includes securing the partition to the vehicle 50 by using the aforementioned attachment device(s), or combination thereof, to attach an aforementioned attachment point(s) to the frontal headrest pole(s), frontal seat grab bar, other frontal vehicle feature, or combination thereof. Additional mounting of the partition 35 can also include securing the partition 35 to the vehicle 50 by using the aforementioned attachment device (s), or combination thereof, to the aforementioned attachment point(s) to a rearward vehicle attachment feature, such as the pole of a headrest from a seat being partitioned, grab bar on the back of the seat being partitioned, other vehicle feature, or combination thereof.

Installation of the partition 15, 35 is not limited to one partition per row of seats. When there are more than two seats, or seating locations, in a row, an additional partition(s) may be installed. As an example, a bench seat with seating for three, could have two partitions installed, thus separating all three occupants or children.

The present invention may include a vehicle partitioning system and the apparatus described herein. For example, the vehicle partitioning system and/or partition 15, 35 may be packaged as a kit for partitioning a bench seat (as in FIGS. 1-7) or two adjacent bucket seats (as in FIGS. 8-12), in a vehicle 40, 50. The kit can include components or a combination of components as described herein, that are assembled or put together and the partition 15, 35 described herein. A kit can be arranged to accommodate various vehicle sizes, models, makers, or a combination thereof.

As can be appreciated by the Ordinary Artisan, the partition 15, 35 may help protect one passenger or child from another and reduce the annoyances and distractions to the driver and/ or other passengers. Additionally, the partition 15, 35 may be arranged for compact storage, may be made to have accident-friendly construction, may permit view of children from front of the vehicle, may minimally impair driver vision, and may be easy to install and remove.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A partition for use in a vehicle having an interior cabin space including at least a pair of rows of seats, the partition comprising:
    (a) a deformable frame defining a perimeter, the deformable frame being at least partially covered with a fabric material;
    (b) a first attachment device for attaching the deformable frame to a portion of a front row of seats of the vehicle; and
    (c) a second attachment device for attaching the deformable frame to a portion of a rear row of seats of the vehicle;
    (d) wherein, upon installation in the vehicle, the deformable frame is arranged, in a front-to-rear orientation, between first and second passenger seats in the rear row.

2. The partition of claim 1, wherein at least one of the first and second attachment devices is configured to be attachable to a headrest of one of the rows of seats of the vehicle.

3. The partition of claim 1, wherein the deformable frame is formed of a deformable wire.

4. The partition of claim 3, wherein the fabric material fully covers the deformable frame, thereby defining a hollow interior.

5. The partition of claim 3, wherein the deformable frame is configured to be collapsible upon itself, thereby reducing the size thereof for storage.

6. The partition of claim 3, wherein ends of the deformable frame are connected together to form a loop with a crimped connector.

7. The partition of claim 1, wherein at least one of the first and second attachment devices is attached to the deformable frame at an attachment location adjacent the perimeter thereof.

8. The partition of claim 1, wherein at least one of the first and second attachment devices includes a bracket having a tongue portion extendable into a crevasse between a seat bottom and a seat back of the vehicle.

9. The partition of claim 1, wherein at least one of the first and second attachment devices includes a snap hook.

10. The partition of claim 1, wherein the first and second attachment devices are configured to permit tool-less installation of the deformable frame within the vehicle.

11. The partition of claim 1, wherein the deformable frame defines a first panel at least partially covered by the fabric material.

12. The partition of claim 11, further comprising a second deformable frame, wherein the second deformable frame defines a second panel at least partially covered by a fabric material, the second panel being generally aligned back-to-back with and attached to the first panel.

13. A partition for use in a vehicle having interior cabin space including at least one row of seats, the partition comprising:
    (a) a deformable frame defining a perimeter;
    (b) a base support attached to the deformable frame; and
    (c) a fabric material at least partially covering the deformable frame at the perimeter thereof;
    (d) wherein, upon installation in the vehicle, the base support is adapted to support the deformable frame in an upright position on the floor of a vehicle to separate a first passenger seat of the vehicle from a second passenger seat in the same row.

14. The partition of claim 13, wherein the deformable frame is configured to be collapsible upon itself, thereby reducing the size thereof for storage.

15. The partition of claim 13, wherein the deformable frame is formed of a deformable wire.

16. The partition of claim 15, wherein the fabric material fully covers the deformable frame, thereby defining a hollow interior.

17. A partition for use in a vehicle having interior cabin space including at least one row of seats, the partition comprising:
    (a) a first deformable frame defining a perimeter, the first deformable frame being at least partially covered with a fabric material;
    (b) a second deformable frame; and
    (c) at least one attachment device for attaching the first deformable frame to a portion of the vehicle;
    (d) wherein, upon installation in the vehicle, the first deformable frame separates a first passenger seat of the vehicle from a second passenger seat in the same row;
    (e) wherein the first deformable frame defines a first panel at least partially covered by the fabric material; and
    (f) wherein the second deformable frame defines a second panel at least partially covered by the fabric material, the second panel being generally aligned back-to-back with and attached to the first panel.

18. The partition of claim 17, wherein the at least one attachment device is configured to be attachable to a headrest of the vehicle.

19. The partition of claim 17, wherein each of the first and second deformable frames is formed of a deformable wire.

20. The partition of claim 19, wherein each of the first and second deformable frames is configured to be collapsible, thereby reducing the size thereof for storage.

* * * * *